United States Patent [19]

Shiozaki et al.

[11] 4,229,552
[45] Oct. 21, 1980

[54] FIRE-RETARDANT POLYESTER COMPOSITIONS

[75] Inventors: Masahiro Shiozaki, Yokohama; Kiyoshi Nawata; Kiyokazu Tsunawaki, both of Matsuyama; Kazumi Tsubaki, Ichihara; Akira Yanagimoto, Ichihara; Shunichi Kumazawa, Ichihara, all of Japan

[73] Assignees: Teijin Limited, Osaka; Nissan Chemical Industries Ltd., Tokyo, both of Japan

[21] Appl. No.: 965,396

[22] Filed: Dec. 1, 1978

[30] Foreign Application Priority Data

Dec. 6, 1977 [JP] Japan .................. 52-145704

[51] Int. Cl.² .................... C08L 67/02
[52] U.S. Cl. .................... 525/437
[58] Field of Search .......... 260/860, DIG. 24; 525/437

[56] References Cited

FOREIGN PATENT DOCUMENTS 46-41696 12/1971 Japan.
47-32299 8/1972 Japan.
50-73948 6/1975 Japan.
50-91651 7/1975 Japan.

Primary Examiner—Carman J. Seccuro
Attorney, Agent, or Firm—Sherman & Shalloway

[57] ABSTRACT

A fire-retardant polyester composition comprising a fiber-forming linear polyester having an intrinsic viscosity of at least 0.1 and a fire retardant containing phosphorus and bromine, wherein at least 70 mole % of the polyester consists of a recurring unit of the formula

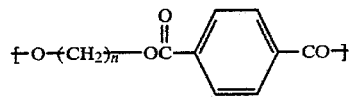

wherein n represents an integer of 2 to 6, and the fire retardant is a copolyphosphonate composed of 1 mole of a recurring unit of the formula

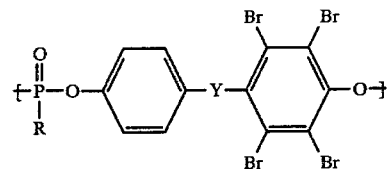

wherein Y represents an isopropylidene or sulfonyl group, and R represents a phenyl or benzyl group, and 0.25 to 10 moles of a recurring unit of the formula

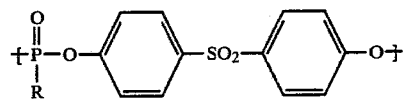

wherein R represents a phenyl or benzyl group, the proportion of the fire retardant being 1 to 20 parts by weight per 100 parts by weight of the polyester.

6 Claims, No Drawings

FIRE-RETARDANT POLYESTER COMPOSITIONS

This invention relates to a fire-retardant polyester composition comprising a polyester composed mainly of alkylene terephthalate units and a copolyphosphonate as a fire retardant.

It is known to produce a fire-retardant polyester composition by adding a bromine compound, a phosphorus compound, a compound containing bromine and phosphorus atoms, or a mixture of these compounds as a fire retardant to a polyester.

Addition of a phosphorus compound or a compound containing bromine and phosphorus atoms as a fire retardant is disclosed, for example, in the following patent literature.

(A) Japanese Patent Publication No. 32299/72 discloses the incorporation of a polyphosphonate of the following formula

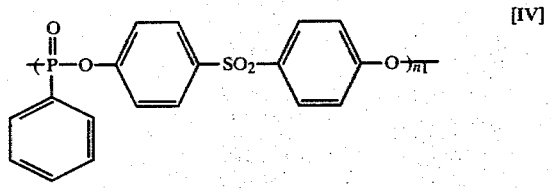

[IV]

wherein $n_1$ represents the average degree of polymerization,
into a polyester.

(B) Japanese Patent Publication No. 41696/71 discloses the incorporation of a polyphosphonate of the following formula

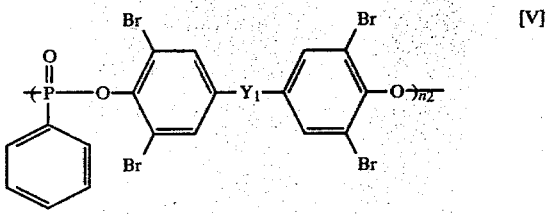

[V]

wherein $Y_1$ represents an alkylidene group containing 1 to 6 carbon atoms, and $n_2$ represents the average degree of polymerization,
into a polyester.

According to the methods disclosed in (A) and (B), the use of large quantities of the polyphosphonates as a fire retardant cannot still impart satisfactory fire retardancy to polyesters.

The joint use of a bromine compound and a phosphorus compound as a fire retardant is disclosed in the following prior art references.

(C) Japanese Laid-Open Patent Publication No. 91651/75 discloses a method for producing a fire-retardant polyester composition which comprises adding the polyphosphonate of formula [IV] in (A) above or formula [V] in (B) above to a copolyester containing a bromine compound copolymerized with it.

(D) Japanese Laid-Open Patent Publication No. 73948/75 discloses a method for producing a fire-retardant polyester composition by adding a bromine compound having a bisphenol S structure and the polyphosphonate of formula [IV] used in (A) above to a polyester.

These methods involving the joint use of bromine and phosphorus compounds as a fire retardant are difficult to impart satisfactory fire retardancy to polyesters.

Fire-retardant polyesters obtained by incorporating the polyphosphonates used as fire retardants in the prior techniques (A), (B), (C) and (D) into polyesters have reduced intrinsic viscosities and poor practical applicability. For example, when they are shaped into fibers, filament breakage occurs frequently during spinning and drawing steps. These methods also have the defect that the incorporation of such polyphosphonates tends to cause coloration to the resulting fire-retardant polyester compositions.

It is an object of this invention therefore to provide a fire-retardant polyester composition which exhibits a high level of fire retardancy with little coloration and finds excellent practical applicability, and which is free from the defects of the prior fire-retarding methods.

The above object can be achieved by a fire-retardant polyester composition comprising 100 parts by weight of a polyester and 1 to 20 parts by weight of a copolyphosphonate fire retardant composed of 1 mole of a recurring unit of the formula

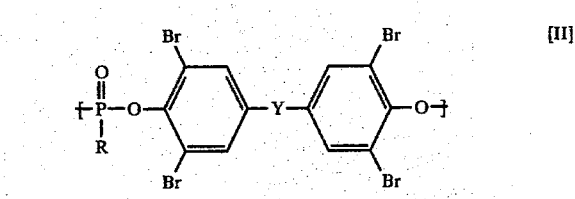

[II]

wherein Y represents an isopropylidene or sulfonyl group, and R represents a phenyl or benzyl group, and 0.25 to 10 moles of a recurring unit of the formula

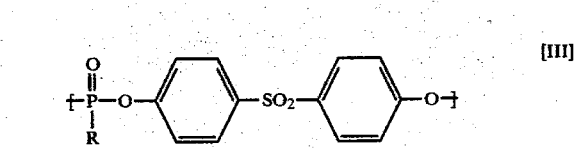

[III]

wherein R represents a phenyl or benzyl group.

The polyester used in this invention is a fiberforming polyester having an intrinsic viscosity [η] of at least 0.35 and at least 70 mole % of which consists of a recurring unit of the formula

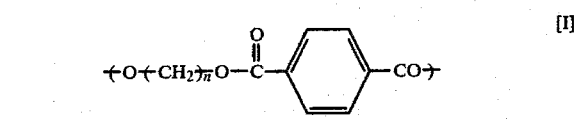

[I]

wherein n represents an integer of 2 to 6.

The polyester comprises terephthalic acid as a main acid component and ethylene glycol, propylene glycol, tetramethylene glycol or the like as a main glycol component. In addition to terephthalic acid, an aromatic dicarboxylic acid such as isophthalic acid or naphthalenedicarboxylic acid or an aliphatic dicarboxylic acid such as adipic acid or suberic acid may be present. As the glycol component, a small amount of a dihydroxy compound such as diethylene glycol, polyethylene glycol or bisphenol A may be used together.

In order to obtain polyester compositions having superior fire retardancy and reduced coloration, it is preferred to use a polyester at least 70 mole% of which consists of the unit of formula [I] in which n is 2 or 4, i.e. a polyester composed mainly of an ethylene terephthalate unit or a butylene terephthalate unit.

These polyesters are known linear polymers used in the production of fibers, films and other shaped articles.

The polyesters used in this invention can be prepared by reacting the aforesaid carboxylic acids or the ester-forming derivatives thereof with the glycols using any known methods and catalysts.

The fire retardant used in this invention is the copolyphosphonate composed mainly of the recurring units of formulae [II] and [III]. The proportion of the recurring unit of formula [III] is 0.25 to 10 moles per mole of the recurring unit of formula [II].

A synergistic fire retarding effect is produced between the recurring units of formulae [II] and [III], and as a result, the copolyphosphonate can impart fully satisfactory fire retardancy to polyesters.

In order to obtain polyester compositions having especially superior fire retardancy and other properties, it is preferred to use a copolyphosphonate having a recurring unit of formula [II] in which Y represents an isopropylidene group and R is a phenyl group.

In the copolyphosphonate used in this invention, the mole ratio of the recurring unit of formula [II] to the recurring unit of formula [III] should be within the range of from 1:0.25 to 1:10. Within this range, a marked synergistic effect in fire retardancy is produced between the two recurring units to impart fully satisfactory fire retardancy to polyesters.

When the mole ratio of the recurring unit of formula [II] to the recurring unit of formula [III] is 1:0.25-10, the number of phosphorus atoms in the copolyphosphonate is 0.31 to 2.8 per bromine atom.

If the proportion of the recurring unit of formula [III] is less than 0.25 mole per mole of the recurring unit of formula [II], the synergistic effect between them is reduced, and satisfactory fire retardancy cannot be imparted to polyesters. The same can be said when the proportion of the recurring unit of formula [III] exceeds 10 moles.

To increase the synergistic effect, the proportion of the recurring unit of formula [III] is preferably 0.4 to 5.5 moles, more preferably 1 to 5.0 moles, per mole of the recurring unit of formula [II].

When the copolyphosphonate is incorporated into polyesters, a high level of fire retardancy can be imparted to the polyesters by the synergistic effect described hereinabove. Accordingly, the amount of the copolyphosphonate added can be comparatively small. Furthermore, fire-retardant polyester compositions obtained by adding this fire retardant do not show an appreciable decrease in intrinsic viscosity as compared with conventional fire-retardant polyesters, and therefore, troubles such as filament breakage during spinning and drawing steps do not occur in the preparation of fibers. The fire-retardant polyester compositions of the invention have a further advantage that they undergo less coloration than the conventional fire-retardant polyesters and have excellent practical applicability.

The production of the fire retardant used in this invention is described in detail in Japanese Laid-Open Patent Publication No. 16096/78. Specifically, it can be prepared, for example, by polycondensing an excess of phosphonic acid dichloride or bromide of the formula

wherein R is as defined hereinabove, and X represents a chlorine or bromine atom,
with a tetrabromo-substitution product of bisphenol A or bisphenol S expressed by the following formula

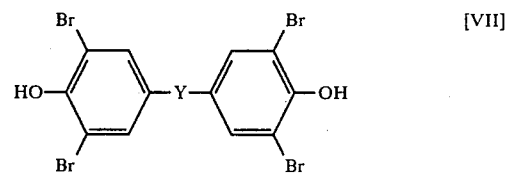

wherein Y is the same as defined hereinabove,
in the presence of a catalyst such as magnesium chloride preferably in an inert reaction solvent such as 1,2-dichloroethane, and then polycondensing the resulting product further with bis(4-hydroxyphenyl)sulfone of the following formula

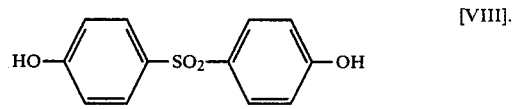

The fire retarding copolymer is obtained in various forms such as a block copolymer, a random copolymer or a structure intermediate between the two. In whatever form it is, it can be equally used to produce an equivalent effect.

The intrinsic viscosity of the fire-retarding copolyphosphonate measured at 30° C. in a 3:2 mixture of phenol/1,1,2,2-tetrachloroethane is at least 0.1 (corresponding to a degree of polymerization of at least 5), preferably at least 0.3, and usually 0.3 to 0.5. The copolymer may be terminated with a bis-(4-hydroxyphenyl) sulfone residue, a brominated biphenol residue, or another monophenol residue.

The amount of the fire retardant used in this invention is 1 to 20 parts by weight, preferably 3 to 15 parts by weight, per 100 parts by weight of the polyester. In adding the fire retardant, it may be used in larger amounts than those specified above if afterward, the composition is further mixed with a fresh polyester to adjust the amount of the fire retardant in the final composition to the above-specified range.

The method and time of incorporating the fire retardant into polyesters in this invention are not particularly limited, and any conventional methods can be followed. For example, the fire retardant may be added immediately before the termination of polyester preparation; or the fire retardant and a polyester may be melt-mixed by using a melt-extruder. The fire-retardant polyester composition so produced can be spun or otherwise fabricated by known methods.

At any desired stage before fabrication, various additives such as heat stabilizers and pigments and if desired other fire retardants and fire retardant aids may be added to the fire-retardant polyester composition.

As stated hereinabove, the present invention can afford a polyester composition having a high level of fire retardancy by incorporating only a single type of fire retardant into a polyester, and is of very high industrial value.

The following examples illustrate the present invention in greater detail. The various properties given in these examples were measured by the following methods.

(1) Intrinsic viscosity

The intrinsic viscosities of non-compounded polyester and fire-retardant polyester composition were determined on the basis of viscosities measured at 35° C. in o-chlorophenol. The intrinsic viscosity of the noncompounded polyester is expressed by $[\eta]$; that of chips of the polyester composition, by $[\eta]_C$; and that of fibers of the polyester composition, by $[\eta]_F$.

(2) LOI

Measured in accordance with the method of JIS-K 7201.

(3) Fire retardancy test (1)

Fire retardancy was rated by a method similar to the coil method described in JIS-L 1091D. O shows "acceptable", and X, "unacceptable".

(4) Fire retardancy test (2)

Fire retardancy was rated by a method similar to the method of DOCFF 3-71 of U.S.A. O shows "acceptable", and X, "unacceptable".

(5) L and b values of color

Colors were shown by L and b values measured by a Hunter color-difference meter. Larger L values show a higher degree of brightness. Larger b values on the (+) side show stronger yellow, and larger b values on the (−) side, stronger bluish tones. Larger (L−b) values show better colors.

(6) Number of filament breakages during spinning

This number is expressed by the number of wrappings that occurred on take-up rollers per $10^6$ meters of undrawn filaments. Smaller numbers show better spinning characteristics.

(7) Wrap rate during drawing

This is expressed by the number of wrappings around rollers caused by filament breakage when drawing filaments wound up on 100 bobbins each having 2.5 kg of the filaments. Smaller numbers show better drawing characteristics.

EXAMPLE 1

A copolyphosphonate as a fire retardant used in the invention was prepared as follows:

(A) A 3-liter glass reaction flask equipped with a stirrer, thermometer, reflux condenser and nitrogen introducing inlet was charged with 585.0 g (3.0 moles) of phenylphosphonic acid dichloride, 326.4 g (0.6 mole) of 2,2-bis(3,5-dibromo-4-hydroxyphenyl) propane, 6.0 g of anhydrous magnesium chloride and 1500 g of 1,2-dichloroethane as a solvent, and they were reacted for 12 hours under boiling and refluxing of the solvent. The reaction was terminated when it was confirmed that the generation of hydrogen chloride gas almost ended. Then, 600.0 g (2.4 moles) of bis(4-hydroxyphenyl)sulfone was added to the reaction mixture, and the mixture was heated with stirring under boiling and refluxing.

After a total time of 36 hours, the reaction was terminated to afford a viscous pale yellow polymer solution. The solution was diluted to about 5 times its volume with 1,2-dichloroethane, and then the diluted solution was poured into a large quantity of methanol. The polymer which precipitated was collected by filtration and dried to afford a copolymer containing phosphorus and bromine as a white powder (designated "fire retardant A").

(B) The same 3-liter glass reaction flask as used in (A) above was charged with 585.0 g (3.0 moles) of phenylphosphonic acid dichloride, 509.4 g (0.9 mole) of bis(3,5-dibromo-4-hydroxyphenyl)sulfone, 3.0 g of anhydrous magnesium chloride and 2000 g of 1,1,2,2-tetrachloroethane as a solvent. Under the boiling and refluxing of the solvent, the reaction was performed for 8 hours. Then, 525.0 g (2.1 moles) of bis(4-hydroxyphenyl)sulfone was additionally fed into the flask, and the reaction was continued for 17 hours under boiling and refluxing, and then terminated. The resulting viscous polymer solution was diluted to about 5 times its volume with 1,1,2,2-tetrachloroethane. By the same way as in (A) above, the diluted solution was poured into methanol to afford a copolymer containing phosphorus and bromine (designated "fire retardant B").

(C) The same 3-liter glass reaction flask as used in (A) above was charged with 585.0 g (3.0 moles) of phenylphosphonic acid dichloride, 816.0 g (1.5 moles) of 2,2-bis(3,5-dibromo-4-hydroxyphenyl)propane, 6.0 g of anhydrous magnesium chloride and 1500 g of 1,2-dichloroethane as a solvent, and the reaction was performed for 16 hours under the boiling and refluxing of the solvent. Then, 375.0 g (1.5 moles) of bis(4-hydroxyphenyl)sulfone was additionally fed into the flask, and the reaction was continued for 20 hours under boiling and refluxing and then terminated. The viscous polymer solution obtained was poured into methanol by the same procedure as in (A) above to afford a copolymer containing phosphorus and bromine as a white powder (designated "fire retardant C").

(D) The same 3-liter glass reaction flask as used in (A) above was charged with 979.2 g (1.8 moles) of 2,2-bis(3,5-dibromo-4-hydroxyphenyl)propane, 300.0 g (1.2 moles) of bis(4-hydroxyphenyl)sulfone, 607.2 g (6.0 moles) of triethylamine and 900 g of 1,2-dichloroethane. Then, the flask was cooled externally with a water bath, and 585.0 g (3.0 moles) of phenylphosphonic acid dichloride diluted with 600 g of 1,2-dichloroethane was added dropwise to the solution from the top of the flask over the period of about 1 hour while maintaining the temperature of the reaction solution at 18°–22° C. The water bath was removed, and the reaction solution was heated with stirring for 8 hours under boiling and refluxing. The resulting pale yellow polymer solution was diluted to 5 times its volume with 1,2-dichloroethane, and then washed three times with pure water in an amount substantially equal to the amount of the diluted polymer solution. The by-product triethylamine hydrochloride was removed, and the residue was poured into methanol. The copolymer that precipitated were separated and recovered (designated "fire retardant D").

(E) The procedure of (C) above was repeated except that 627.0 g (3.0 mole) of benzylphosphonic acid dichloride was used instead of the phenylphosphonic acid dichloride in the first-step reaction. After a total time of 35 hours, a phosphorus-containing polyester as a white powder was obtained (designated "fire retardant E").

The compositions and properties of the resulting fire retardants A to E are shown in Table 1.

TABLE 1

| | Starting compounds for preparing fire retardants | | | Structure of recurring units | | Mole ratio of [III]/[II] | Content of P atoms (wt. %) | Content of Br atoms (wt. %) | Intrinsic viscosity (dl/g) |
|---|---|---|---|---|---|---|---|---|---|
| | Phosphorus compound | Bromine compound | Sulfone compound | [II] | [III] | | | | |
| A | O=P(Cl)(Cl)(C₆H₅) | tetrabromobisphenol A | HO-C₆H₄-SO₂-C₆H₄-OH | [bisphenol A tetrabromo phosphonate unit] | [bisphenol S phosphonate unit] | 4.0 | 7.19 | 14.9 | 0.388 |
| B | O=P(Cl)(Cl)(C₆H₅) | tetrabromobisphenol S | HO-C₆H₄-SO₂-C₆H₄-OH | [bisphenol S tetrabromo phosphonate unit] | [bisphenol S phosphonate unit] | 2.33 | 6.61 | 20.6 | 0.403 |
| C | O=P(Cl)(Cl)(C₆H₅) | tetrabromobiphenol | HO-C₆H₄-SO₂-C₆H₄-OH | [tetrabromobiphenyl phosphonate unit] | [bisphenol S phosphonate unit] | 1.00 | 6.00 | 30.4 | 0.365 |
| D | O=P(Cl)(Cl)(C₆H₅) | tetrabromobiphenol | HO-C₆H₄-SO₂-C₆H₄-OH | [tetrabromobiphenyl phosphonate unit] | [bisphenol S phosphonate unit] | 0.67 | 5.69 | 34.9 | 0.352 |
| E | O=P(Cl)(Cl)(CH₂C₆H₅) | tetrabromobisphenol A | HO-C₆H₄-SO₂-C₆H₄-OH | [bisphenol A tetrabromo benzylphosphonate unit] | [bisphenol S benzylphosphonate unit] | 1.0 | 5.79 | 29.9 | 0.302 |

EXAMPLE 2

One hundred parts by weight of polyethylene terephthalate having an intrinsic viscosity of 0.655 was mixed with 10 parts by weight of fire retardant (A) at a maximum temperature of 275° C. by using a melt-extruder to form chips.

Test pieces were molded from the resulting chips, and their LOI and colors were measured.

Separately, the chips were spun and drawn at a maximum temperature of 285° C. to form multifilaments (75 de/24 fil). Knitted fabrics were made from the filaments, and examined for fire retardancy [the fire retardancy test (1)].

Similarly, the chips were spun, drawn and cut in a customary manner to form staple fibers. The staple fibers were spun on a spinning frame to form spun yarns with a cotton count of 30. A tropical suiting fabric with a basis weight of 150 g/m² was made from the spun yarns, and examined for fire retardancy [the fire retardancy test (2)].

The results are shown in Table 3.

EXAMPLES 3 TO 5

The same experiments as in Example 2 were carried out using fire retardants (B), (C) and (D) respectively. The results are also shown in Table 3.

EXAMPLES 6 AND 7

One hundred parts by weight of polybutylene terephthalate having an intrinsic viscosity of 1.110 was melt-mixed with 11.1 parts of fire retardant (C) or (E) at a maximum temperature of 250° C. to form chips. The LOI and colors of the chips were measured, and the results are shown in Table 3.

Some comparative runs were conducted using the fire retardants having the structures shown in Table 2 below.

phosphonic acid dichloride, 544.0 g (1.0 mole) of 2,2-bis(3,5-dibromo-4-hydroxyphenyl)propane, 400 g of 1,1,2,2-tetrachloroethane and 1.0 g of anhydrous magnesium chloride. The reaction was performed for 24 hours under boiling and refluxing of the solvent to afford a pale yellow polymer solution. The polymer solution was diluted to about 3 times its volume with 1,1,2,2-tetrachloroethane. The diluted solution was poured into a large quantity of methanol to precipitate the polymer, which was collected by filtration, washed with methanol and dried to afford a polymer containing phosphorus and bromine as a white powder having a melting point of 203° to 208° C.

Fire retardant G

The same 1-liter glass reaction flask as used in the preparation of fire retardant F was charged with 195.0 g (1.0 mole) of phenylphosphonic acid dichloride, 250.3 g (1.0 mole) of bis(4-hydroxydiphenyl)sulfone, 300 g of 1,2-dichloroethane and 0.8 g of anhydrous magnesium chloride. The reaction was performed for 16 hours under boiling and refluxing of the solvent. The resulting polymer solution was diluted to about 5 times its volume with 1,2-dichloroethane. The diluted solution was poured into a large quantity of methanol to precipitate the polymer, which was collected by filtration, washed with methanol and dried to afford a phosphorus-containing polymer as a white powder having a melting point of 173° to 176° C.

Fire retardant H

GREAT LAKES BA-50, a product of Great Lakes Chemical Corp.

Fire retardant I

The same 1-liter glass reaction flask as used in the preparation of fire retardant F was charged with 250.3 g (1.0 mole) of bis(4-hydroxyphenyl)sulfone, 300 g of 1,2-dichloroethane and 101.2 g (2.0 moles) of triethylamine. The flask was cooled externally with a water bath, and while maintaining the temperature of the

TABLE 2

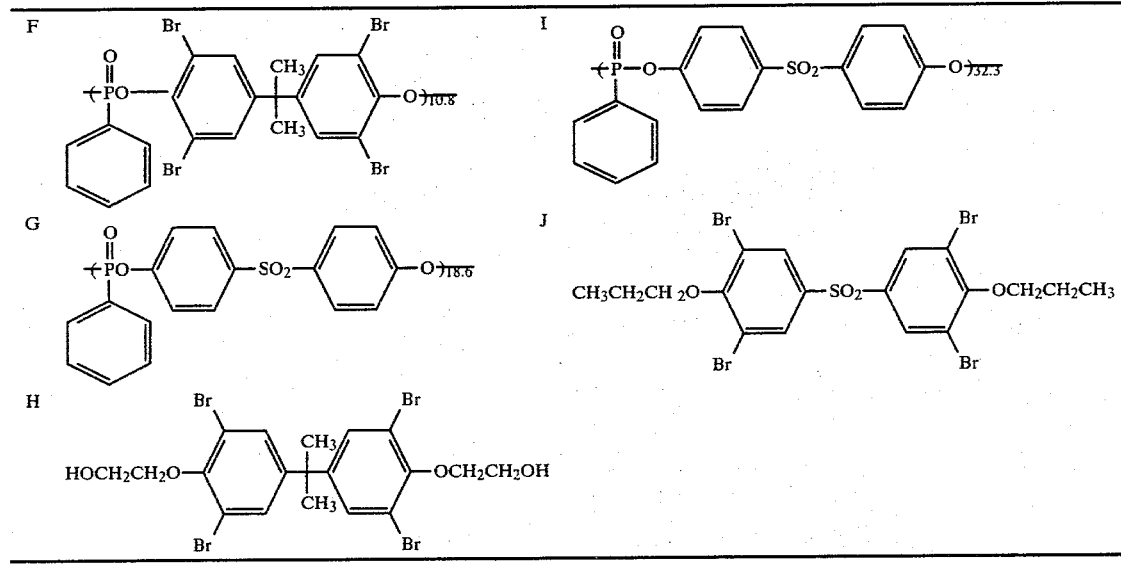

These fire retardants are prepared by the following procedures.

Fire retardant F

A 1-liter glass reaction flask equipped with a stirrer, thermometer, reflux condenser and nitrogen introducing inlet was charged with 195.0 g (1.0 mole) of phenyl-reaction solution at 18°–22° C., 195.0 g (1.0 L mole) of phenylphosphonic acid dichloride diluted with 200 g of 1,2-dichloroethane was added dropwise to the solution from the top of the flask over the period of about 1 hour. The water bath was then removed, and the reaction mixture was heated with stirring under boiling and refluxing for 8 hours. The resulting pale yellow polymer solution was diluted to about 7 times its volume with 1,2-dichloroethane, and washed five times with water. The by-product triethylamine hydrochloride was removed, and the residue poured into methanol to precipitate the polymer. The polymer was collected by filtration, washed with methanol and dried to afford a phosphorus-containing polymer as a white powder having a melting point of 175° to 178° C.

Fire retardant J

A 3-liter glass reaction vessel equipped with a stirrer, thermometer, condenser and nitrogen introducing inlet was charged with 40.4 g (1.01 moles) of sodium hydroxide, 250 ml of water and 283.0 g (0.5 mole) of bis(3,5-dibromo-4-hydroxyphenyl)sulfone, and then 1000 ml of benzene was added. With stirring, the mixture was heated to 100° C. Water was removed as an azeotrope with benzene, and about a half of the remaining benzene was further distilled off. To the resulting slurry was added 600 ml of dimethyl acetamide, and the mixture was heated. To the solution was added 135.3 g (1.1 moles) of propyl bromide. The reaction was performed at 80° C. for 24 hours. The resulting whitish turbid slurry-like reaction mixture was poured into 5 liters of water. The white precipitate was collected by filtration, washed three times with methanol and five times with water, and dried under reduced pressure to afford a white solid having a bromine content of 48.6%.

COMPARATIVE EXAMPLES 1 TO 3

The procedure of Example 2 was repeated except that instead of the fire retardant (A), the fire retardant (F) was used in the amounts indicated in Table 3. The results are shown in Table 3.

COMPARATIVE EXAMPLES 4 TO 6

The procedure of Example 2 was repeated except that instead of the fire retardant (A), the fire retardant (G) was used in the amounts indicated in Table 3. The results are also shown in Table 3.

COMPARATIVE EXAMPLE 7

Polyethylene terephthalate having fire retardant (H) copolymerized with it was prepared in such a manner that the bromine content of the final copoly(ethylene terephthalate) became 6.4% by weight. One hundred parts by weight of the copolyethylene terephthalate was melt-mixed with 4.0 parts by weight of fire retardant (I) to produce a polyester containing 0.32% by weight of phosphorus and 6.2% by weight of bromine. The polyester composition obtained was tested in the same way as in Example 2, and the results are shown in Table 3.

COMPARATIVE EXAMPLE 8

In the same way as in Comparative Example 7, a polyester composition containing 0.20% by weight of phosphorus and 6.20% of bromine was prepared. It was tested in the same way as in Example 2. The results are shown in Table 3.

COMPARATIVE EXAMPLES 9 AND 10

The procedure of Example 2 was performed except that fire retardants (I) and (J) were used instead of the fire retardant (A). The results are shown in Table 3.

COMPARATIVE EXAMPLES 11 TO 14

The procedure of Example 6 was repeated except that fire retardant (I) or (F) was used instead of fire retardant (C) or (E). The results are shown in Table 3.

CONTROL 1

The fire retardancy, spinnability and fiber properties of polyethylene terephthalate containing no fire retardant were measured, and the results are shown in Table 3.

CONTROL 2

The fire retardancy of polybutylene terephthalate containing no fire retardant were measured, and the results are shown in Table 3.

TABLE 3

| Example (Ex.), Comparative Example (CEx.), or Control (C.) | Polyester Polyethylene terephthalate (PET) or polybutylene terephthalate (PBT) | [η] | Fire retardant Type | Amount added Parts by weight | Wt. % | Br content (wt. %) | P content (wt. %) | Test pieces (chips) of the fire-retardant polyester composition [η]C | Softening point (°C.) | Color tone L | Color tone a | Color tone b | LOI | Spinnability Number of filament breakage | Wrap rate during drawing | Fiber properties [η]F | Fire retardancy Test (1) | Test (2) |
|---|---|---|---|---|---|---|---|---|---|---|---|---|---|---|---|---|---|---|
| Ex. 2 | PET | 0.655 | A | 10 | 9.09 | 1.35 | 0.65 | 0.623 | 258.7 | 78.6 | 5.4 | | 32.0 | 0.3 | 0.5 | 0.601 | O | O |
| Ex. 3 | " | " | B | 8 | 7.41 | 1.55 | 0.50 | 0.634 | 259.1 | 80.5 | 4.7 | | 30.5 | 0.4 | 0.8 | 0.599 | O | O |
| Ex. 4 | " | " | C | 10 | 9.09 | 2.80 | 0.54 | 0.615 | 257.5 | 77.6 | 6.6 | | 31.5 | 0.3 | 1.0 | 0.592 | O | O |
| Ex. 5 | " | " | D | 10 | 9.09 | 3.18 | 0.51 | 0.605 | 257.8 | 78.7 | 5.8 | | 33.0 | 0.5 | 0.5 | 0.575 | O | O |
| Ex. 6 | PBT | 1.110 | C | 10 | 10 | 3.08 | 0.60 | 0.951 | 224.3 | 79.8 | 6.6 | | 30.0 | | | | | |
| Ex. 7 | " | " | E | 11.1 | 10 | 3.00 | 0.58 | 0.815 | 224.6 | 79.7 | 8.5 | | 30.2 | | | | | |
| CEx. 1 | PET | 0.655 | F | 11.1 | 13.8 | 5.52 | 0.64 | 0.429 | 246.3 | 65.4 | 14.8 | | 30.5 | 20.0 | 10 | 0.383 | | X |
| CEx. 2 | " | " | " | 16 | 9.09 | 4.37 | 0.42 | 0.525 | 248.6 | 72.0 | 12.5 | | 28.0 | 23 | 12 | 0.444 | O | X |
| CEx. 3 | " | " | " | 10 | 5.66 | 2.27 | 0.26 | 0.598 | 249.8 | 74.7 | 8.1 | | 24.5 | 0.9 | 6 | 0.515 | O | X |
| CEx. 4 | " | " | G | 6 | 12.28 | | 1.02 | 0.489 | 246.5 | 72.1 | 10.3 | | 29.5 | 1.1 | 5 | 0.397 | O | X |
| CEx. 5 | " | " | " | 14 | 9.09 | | 0.76 | 0.517 | 249.7 | 76.0 | 10.6 | | 27.0 | 1.0 | 13 | 0.413 | O | X |
| CEx. 6 | " | " | " | 10 | 4.76 | | 0.40 | 0.603 | 251.9 | 78.8 | 5.9 | | 24.0 | 0.8 | 5 | 0.527 | O | X |
| CEx. 7 | H-copolymerized PET | 0.575 | I(+H) | 5 | 3.85 | 6.20 | 0.32 | 0.537 | 250.4 | 66.3 | 11.8 | | 29.5 | 2.1 | 21 | 0.335 | O | X |
| CEx. 8 | H-copolymerized PET | " | " | 4 | 2.44 | 6.20 | 0.20 | 0.543 | 251.7 | 74.3 | 9.7 | | 26.0 | 1.5 | 7 | 0.498 | O | X |
| CEx. 9 | PET | 0.655 | I + J | 2.5 | 12.97 | 4.23 | 0.33 | 0.488 | 245.2 | 72.0 | 13.6 | | 28.0 | 17 | 22 | 0.323 | O | X |
| CEx. 10 | " | " | " | I. 4.6 J. 10.3 | I. 1.90 J. 1.90 | 0.92 | 0.16 | 0.555 | 255.4 | 73.1 | 8.1 | | 22.5 | 0.8 | 6 | 0.504 | X | X |
| CEx. 11 | PBT | 1.110 | I | I. 2.0 J. 2.0 | I. 12.28 J. 10 | | 1.02 | 0.688 | 220.1 | 70.8 | 12.3 | | 30.0 | | | | | |
| CEx. 12 | " | " | " | 14 | 10 | | 0.83 | 0.653 | 221.7 | 78.2 | 4.9 | | 26.2 | | | | | |
| CEx. 13 | " | " | F | 11.1 | 9.90 | 3.96 | 0.46 | 0.703 | 219.7 | 71.3 | 11.6 | | 29.0 | | | | | |
| CEx. 14 | " | " | " | 11.1 | 10 | 4.80 | 0.47 | 0.610 | 218.4 | 69.7 | 9.8 | | 27.8 | | | | | |
| C. 1 | PET | 0.655 | | | | | | 0.650 | 261.8 | 81.7 | 3.2 | | 22.0 | 0.2 | 0.1 | 0.622 | X | X |
| C. 2 | PBT | 1.110 | | | | | | 1.050 | 225.7 | 83.0 | 2.5 | | 21.6 | | | | | |

What we claim is:

1. A fire-retardant polyester composition comprising a fiber-forming linear polyester and a fire retardant containing phosphorus and bromine, wherein at least 70 mole% of the polyester consists of a recurring unit of the formula

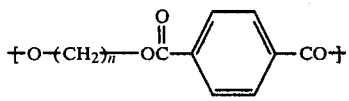
[I]

wherein n represents an integer of 2 to 6, and the fire retardant is a copolyphosphonate composed of 1 mole of a recurring unit of the formula

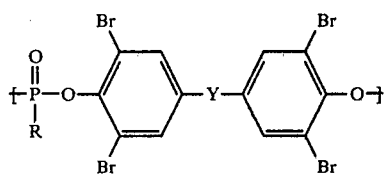
[II]

wherein Y represents an isopropylidene or sulfonyl group, and R represents a phenyl or benzyl group, and 0.25 to 10 moles of a recurring unit of the formula

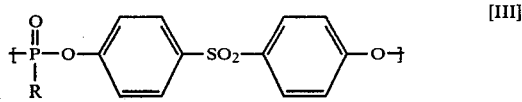
[III]

wherein R represents a phenyl or benzyl group, the proportion of the fire retardant being 1 to 20 parts by weight per 100 parts by weight of the polyester.

2. The composition of claim 1 wherein n is 2 in formula [I].

3. The composition of claim 1 wherein n is 4 in formula [I].

4. The composition of claim 1 wherein Y is an isopropylidene group in formula [II].

5. The composition of claim 1 wherein R is a phenyl group.

6. The composition of claim 1 wherein Y is an isopropylidene group and R is a phenyl group in formula [II].

* * * * *